United States Patent
Konstantinov et al.

(10) Patent No.: US 10,331,711 B2
(45) Date of Patent: Jun. 25, 2019

(54) METHOD AND APPARATUS FOR PROVIDING AN INTERACTIVE MAP SECTION ON A USER INTERFACE OF A CLIENT DEVICE

(71) Applicant: YANDEX EUROPE AG, Lucerne (CH)

(72) Inventors: Sergey Sergeevich Konstantinov, Moscow (RU); Marina Borisovna Stepanova, Moscow region (RU)

(73) Assignee: YANDEX EUROPE AG, Lucerne (CH)

( * ) Notice: Subject to any disclaimer, the term of this patent is extended or adjusted under 35 U.S.C. 154(b) by 212 days.

(21) Appl. No.: 15/120,546

(22) PCT Filed: Oct. 7, 2014

(86) PCT No.: PCT/IB2014/065119
§ 371 (c)(1),
(2) Date: Aug. 22, 2016

(87) PCT Pub. No.: WO2015/145223
PCT Pub. Date: Oct. 1, 2015

(65) Prior Publication Data
US 2017/0068687 A1    Mar. 9, 2017

(30) Foreign Application Priority Data
Mar. 24, 2014  (RU) ................. 2014111336

(51) Int. Cl.
*G06F 17/30* (2006.01)
*G06F 16/29* (2019.01)
(Continued)

(52) U.S. Cl.
CPC .............. *G06F 16/29* (2019.01); *G06F 9/451* (2018.02); *G06F 16/248* (2019.01);
(Continued)

(58) Field of Classification Search
CPC ...... G06F 17/30; G06F 17/30241; G06F 9/44; G06F 9/4443; G06F 16/29; G06F 9/451
See application file for complete search history.

(56) References Cited

U.S. PATENT DOCUMENTS 7,486,840 B2   2/2009   Blais
7,492,965 B2   2/2009   Blais
(Continued)

FOREIGN PATENT DOCUMENTS

EA   200900801 A1   2/2010
EP      1681536 B1   9/2009
(Continued)

OTHER PUBLICATIONS

International Search Report for PCT/IB2014/065119, dated Oct. 23, 2015, Lee W. Young.
(Continued)

*Primary Examiner* — Andrea C Leggett
(74) *Attorney, Agent, or Firm* — BCF LLP (57) ABSTRACT

A method for providing an interactive map section on a user interface of a client device has the steps of sending a request for a map section; sending a request for information associated with the map section; receiving the map section, the map section forming a map layer; receiving instructions for generating an object layer containing at least one object associated with the requested information; generating the object layer on the client device using the instructions for generating the object layer; receiving instructions for generating a logical layer; generating the logical layer on the client device using the instructions for generating the logical layer; merging the map layer, the object layer and the logical layer on the client device to generate the interactive map section; and displaying the interactive map section on the
(Continued)

user interface of the client device. The logical layer contains at least one interactive element.

20 Claims, 7 Drawing Sheets

(51) Int. Cl.
*G06F 9/451* (2018.01)
*G06F 16/248* (2019.01)
*G06F 16/9537* (2019.01)
*H04L 29/06* (2006.01)
*H04L 29/08* (2006.01)
*G09G 5/377* (2006.01)

(52) U.S. Cl.
CPC ......... *G06F 16/9537* (2019.01); *G09G 5/377* (2013.01); *H04L 67/18* (2013.01); *H04L 67/42* (2013.01)

(56) References Cited

U.S. PATENT DOCUMENTS

| | | | |
|---|---|---|---|
| 8,429,536 B2 | 4/2013 | Callicrate et al. | |
| 2005/0267854 A1 | 12/2005 | Blais | |
| 2007/0229538 A1 | 10/2007 | Klassen et al. | |
| 2013/0342545 A1 | 12/2013 | Appleton et al. | |
| 2014/0075358 A1* | 3/2014 | Barros | G06F 17/30241 715/771 |

FOREIGN PATENT DOCUMENTS

| | | |
|---|---|---|
| RU | 2470485 C2 | 12/2012 |
| RU | 2497188 C2 | 10/2013 |
| WO | 2009002942 A2 | 12/2008 |

OTHER PUBLICATIONS

English abstract of EA 200900801 retrieved from Espacenet on May 31, 2016.

* cited by examiner

METHOD AND APPARATUS FOR PROVIDING AN INTERACTIVE MAP SECTION ON A USER INTERFACE OF A CLIENT DEVICE

CROSS-REFERENCE

The present application claims priority to Russian Patent Application No. 2014111336, filed Mar. 24, 2014, entitled "METHOD AND APPARATUS FOR PROVIDING AN INTERACTIVE MAP SECTION ON A USER INTERFACE OF A CLIENT DEVICE" the entirety of which is incorporated herein.

TECHNICAL FIELD

The present technology relates to methods and apparatuses for providing an interactive map section on a user interface of a client device.

BACKGROUND

Many web sites and applications for electronic devices display geographical maps. Also, some applications are dedicated solely to the display of geographical maps. In addition to displaying the geographical maps, these web sites and applications often display objects overlaid on the map to show objects such as points of interest, waypoints, labels, icons, itinerary and the like. In many cases, these maps are interactive. For example, for a map displayed on a web browser, moving the mouse pointer over an object on the map can cause the display of a description of the object, such as the address or the name of the location. In the same example, clicking on the object can display a balloon containing additional information associated with the location represented by the object, such as the name of the location, address, phone number, link to the web site, and in the case of service businesses, such as restaurants and hotels, ratings, links for making a reservation or to clients' reviews.

In order to provide such interactive maps on a user interface, a user's request for a particular map section and associated objects is sent to servers associated with the particular web site or application being used. For example, a person could be looking for the location of banks in a particular city. A map server retrieves a map tile or tiles corresponding to the requested map section. An application server retrieves information corresponding to the location requested including objects and data to generate the interactive elements of the map. The server side of the system then generates and renders an object layer which, when overlaid on the map section, positions the objects in the correct location on the map, and generates a logical layer which will result in various actions occurring when the user interacts with the objects. The server side then merges the map section (i.e. a map layer), the object layer and the logical layer and sends them back to the client's device to be displayed on the user interface for the user to view and interact with. In other embodiments, the map section, the generated and rendered object layer and the generated logical layer are sent to the client's device where the object and logical layers are merged with the map section.

As would be appreciated the amount of processing power required on the server side is quite high considering the high number of requests that can be received on such servers. Also, when a user wishes to pan or zoom the map, this can result in a new request having to be generated, which can require new computations having to be made on the server side. Furthermore, when there are too many objects to be displayed on the map, the application displaying the map on the client device may crash.

This problem is further exacerbated in those circumstances, when for a given web site of general interest (such as a bank web site, for example) a map section is generated within one of the web pages of the web site (for example, in the "contact us" portion of the web site). It is typical, for the map section information to come from a third party (map service provider or the like). Within such an architecture, it is typical for the operator of the given web site to have to provide some or all of the data for the aforementioned object and logical layers (typically through an Application Programming Interface associated with such the third party). This, in turn, can place an undue burden (both in terms of computational power, required software and/or skills) onto the operator of the given web site.

One method of reducing the amount of processing power required on the server side in response to such a request consists in either removing the logical layer completely or reducing the amount of information contained in the logical layer. However, as would be understood, this results in a less enjoyable experience by the user as the resulting map has less functionality.

There is therefore a need of a method and apparatus for providing a map on a user interface that reduces the processing power necessary on the server side.

SUMMARY

It is an object of the present technology to ameliorate at least some of the inconveniences present in the prior art.

According to an aspect of the present technology, there is provided a method for providing an interactive map section on a user interface of a client device comprising: sending, from the client device to at least one server via a communication network, a request for a map section; sending, from the client device to the at least one server via the communication network, a request for information associated with the map section; receiving, from the at least one server by the client device via the communication network, the map section, the map section forming a map layer; receiving, from the at least one server by the client device via the communication network, instructions for generating an object layer, the object layer containing at least one object associated with the requested information; generating the object layer on the client device using the instructions for generating the object layer; receiving, from the at least one server by the client device via the communication network, instructions for generating a logical layer; generating the logical layer on the client device using the instructions for generating the logical layer; merging the map layer, the object layer and the logical layer on the client device to generate the interactive map section; and displaying the interactive map section on the user interface of the client device. The logical layer contains at least one interactive element adapted to be activated as a result of a user interacting, via the user interface, with at least one object of the at least one object of the object layer.

In some implementations of the present technology, the at least one server includes a mapping server and an application server. Sending, from the client device to the at least one server via the communication network, the request for the map section includes sending, from the client device to the mapping server via the communication network, the request for the map section. Sending, from the client device to the at least one server via the communication network, the request for information associated with the map section includes sending, from the client device to the application server via the communication network, the request for information associated with the map section. Receiving, from the at least one server by the client device via the communication network, the map section includes receiving, from the mapping server by the client device via the communication network, the map section. Receiving, from the at least one server by the client device via the communication network, instructions for generating the object layer includes receiving, from the application server by the client device via the communication network, instructions for generating the object layer. Receiving, from the at least one server by the client device via the communication network, instructions for generating the logical layer includes receiving, from the application server by the client device via the communication network, instructions for generating the logical layer.

In some implementations of the present technology, in the interactive map section, each object of the object layer has at least one interactive element associated therewith.

In some implementations of the present technology, in the interactive map section, each object of the object layer has at least a first interactive element and a second interactive element associated therewith. For each object of the object layer: the first interactive element associated with the object is adapted to be activated as a result of a first user interaction, via the user interface, with the object; and the second interactive element associated with the object is adapted to be activated as a result of a second user interaction, via the user interface, with the object.

In some implementations of the present technology, a set of coordinates defining an interaction region on the interactive map for activating one of the at least one interactive element corresponds to a set of coordinates of a region of the map section covered by a corresponding object of the at least one object.

In some implementations of the present technology, the map section comprises at least one map tile.

In some implementations of the present technology, the object layer contains at least two objects associated with the requested information.

In some implementations of the present technology, the instructions for generating the object layer and the instructions for generating the logical layer are received as a combined set of instructions comprising the instructions for generating the object layer and the instructions for generating the logical layer.

According to another aspect of the present technology, there is provided a method for providing an interactive map section on a user interface of a client device comprising: receiving, by at least one server from the client device via a communication network, a request for a map section; receiving, by at least one server from the client device via a communication network, a request for information associated with the map section; sending, by the at least one server to the client device via the communication network, the map section, the map section forming a map layer; sending, by the at least one server to the client device via the communication network, instructions for generating an object layer on the client device, the object layer containing at least one object associated with the requested information; and sending, by the at least one server to the client device via the communication network, instructions for generating a logical layer on the client device. The client device is adapted for: generating the object and logical layers, merging the map layer, the object layer and the logical layer to generate the interactive map section, and displaying the interactive map section on the user interface of the client device. The logical layer contains at least one interactive element adapted to be activated as a result of a user interacting, via the user interface, with at least one object of the at least one object of the object layer.

In some implementations of the present technology, the at least one server includes a mapping server and an application server. Receiving, by the at least one server from the client device via the communication network, the request for the map section includes receiving, by the mapping server from the client device via the communication network, the request for the map section. Receiving, by the at least one server from the client device via the communication network, the request for information associated with the map section includes receiving, by the application server from the client device via the communication network, the request for information associated with the map section. Sending, by the at least one server to the client device via the communication network, the map section includes sending, by the mapping server to the client device via the communication network, the map section. Sending, by the at least one server to the client device via the communication network, instructions for generating the object layer includes sending, by the application server to the client device via the communication network, instructions for generating the object layer. Sending, by the at least one server to the client device via the communication network, instructions for generating the logical layer includes sending, by the application server to the client device via the communication network, instructions for generating the logical layer.

In some implementations of the present technology, the instructions for generating the logical layer include instructions for generating the at least one interactive element, the at least one interactive element including at least one interactive element for each object of the object layer.

In some implementations of the present technology, the at least one interactive element for each object of the object layer has at least a first interactive element and a second interactive element. For each object of the object layer: the first interactive element associated with the object is adapted to be activated as a result of a first user interaction, via the user interface, with the object; and the second interactive element associated with the object is adapted to be activated as a result of a second user interaction, via the user interface, with the object.

In some implementations of the present technology, the map section comprises at least one map tile.

In some implementations of the present technology, the object layer contains at least two objects associated with the requested information.

In some implementations of the present technology, the instructions for generating the object layer and the instructions for generating the logical layer are sent as a combined set of instructions comprising the instructions for generating the object layer and the instructions for generating the logical layer.

According to another aspect of the present technology, there is provided a method for providing an interactive map section on a user interface of a client device comprising: receiving, by an application server from the client device via a communication network, a request for information associated with a map section; sending, by the application server to the client device via the communication network, instructions for generating an object layer on the client device, the object layer containing at least one object associated with the requested information; and sending, by the application server to the client device via the communication network, instructions for generating a logical layer on the client device. The client device is adapted for: receiving, from a mapping server by the client device via the communication network, the map section, the map section forming a map layer; merging the map layer, the object layer and the logical layer to generate the interactive map section; and displaying the interactive map section on the user interface of the client device. The logical layer contains at least one interactive element adapted to be activated as a result of a user interacting, via the user interface, with at least one object of the at least one object of the object layer.

In some implementations of the present technology, the instructions for generating the logical layer include instructions for generating the at least one interactive element, the at least one interactive element including at least one interactive element for each object of the object layer.

In some implementations of the present technology, the at least one interactive element for each object of the object layer has at least a first interactive element and a second interactive element. For each object of the object layer: the first interactive element associated with the object is adapted to be activated as a result of a first user interaction, via the user interface, with the object; and the second interactive element associated with the object is adapted to be activated as a result of a second user interaction, via the user interface, with the object.

In some implementations of the present technology, the map section comprises at least one map tile.

In some implementations of the present technology, the object layer contains at least two objects associated with the requested information.

In some implementations of the present technology, the instructions for generating the object layer and the instructions for generating the logical layer are sent as a combined set of instructions comprising the instructions for generating the object layer and the instructions for generating the logical layer.

According to another aspect of the present technology, there is provided a system for providing an interactive map section on a user interface of a client device. The system has a processor, and a computer usable information storage medium communicating with the processor and storing instructions that cause the system to perform the steps of: sending, from the client device to at least one server via a communication network, a request for a map section; sending, from the client device to the at least one server via the communication network, a request for information associated with the map section; receiving, from the at least one server by the client device via the communication network, the map section, the map section forming a map layer; receiving, from the at least one server by the client device via the communication network, instructions for generating an object layer, the object layer containing at least one object associated with the requested information; generating the object layer on the client device using the instructions for generating the object layer; receiving, from the at least one server by the client device via the communication network, instructions for generating a logical layer; generating the logical layer on the client device using the instructions for generating the logical layer; merging the map layer, the object layer and the logical layer on the client device to generate the interactive map section; and displaying the interactive map section on the user interface of the client device. The logical layer contains at least one interactive element adapted to be activated as a result of a user interacting, via the user interface, with at least one object of the at least one object of the object layer.

In some implementations of the present technology, the at least one server includes a mapping server and an application server. Sending, from the client device to the at least one server via the communication network, the request for the map section includes sending, from the client device to the mapping server via the communication network, the request for the map section. Sending, from the client device to the at least one server via the communication network, the request for information associated with the map section includes sending, from the client device to the application server via the communication network, the request for information associated with the map section. Receiving, from the at least one server by the client device via the communication network, the map section includes receiving, from the mapping server by the client device via the communication network, the map section. Receiving, from the at least one server by the client device via the communication network, instructions for generating the object layer includes receiving, from the application server by the client device via the communication network, instructions for generating the object layer. Receiving, from the at least one server by the client device via the communication network, instructions for generating the logical layer includes receiving, from the application server by the client device via the communication network, instructions for generating the logical layer.

In some implementations of the present technology, in the interactive map section, each object of the object layer has at least one interactive element associated therewith.

In some implementations of the present technology, in the interactive map section, each object of the object layer has at least a first interactive element and a second interactive element associated therewith. For each object of the object layer: the first interactive element associated with the object is adapted to be activated as a result of a first user interaction, via the user interface, with the object; and the second interactive element associated with the object is adapted to be activated as a result of a second user interaction, via the user interface, with the object.

In some implementations of the present technology, a set of coordinates defining an interaction region on the interactive map for activating one of the at least one interactive element corresponds to a set of coordinates of a region of the map section covered by a corresponding object of the at least one object.

In some implementations of the present technology, the map section comprises at least one map tile.

In some implementations of the present technology, the object layer contains at least two objects associated with the requested information.

In some implementations of the present technology, the instructions for generating the object layer and the instructions for generating the logical layer are received as a combined set of instructions comprising the instructions for generating the object layer and the instructions for generating the logical layer.

According to another aspect of the present technology, there is provided a computer usable information storage medium storing instructions for providing an interactive map section on a user interface of a client device that, when executed by a computer, cause the computer to perform operations comprising: sending, from the client device to at least one server via a communication network, a request for a map section; sending, from the client device to the at least one server via the communication network, a request for information associated with the map section; receiving, from the at least one server by the client device via the communication network, the map section, the map section forming a map layer; receiving, from the at least one server by the client device via the communication network, instructions for generating an object layer, the object layer containing at least one object associated with the requested information; generating the object layer on the client device using the instructions for generating the object layer; receiving, from the at least one server by the client device via the communication network, instructions for generating a logical layer; generating the logical layer on the client device using the instructions for generating the logical layer; merging the map layer, the object layer and the logical layer on the client device to generate the interactive map section; and displaying the interactive map section on the user interface of the client device. The logical layer contains at least one interactive element adapted to be activated as a result of a user interacting, via the user interface, with at least one object of the at least one object of the object layer.

In some implementations of the present technology, the at least one server includes a mapping server and an application server. Sending, from the client device to the at least one server via the communication network, the request for the map section includes sending, from the client device to the mapping server via the communication network, the request for the map section. Sending, from the client device to the at least one server via the communication network, the request for information associated with the map section includes sending, from the client device to the application server via the communication network, the request for information associated with the map section. Receiving, from the at least one server by the client device via the communication network, the map section includes receiving, from the mapping server by the client device via the communication network, the map section. Receiving, from the at least one server by the client device via the communication network, instructions for generating the object layer includes receiving, from the application server by the client device via the communication network, instructions for generating the object layer. Receiving, from the at least one server by the client device via the communication network, instructions for generating the logical layer includes receiving, from the application server by the client device via the communication network, instructions for generating the logical layer.

In some implementations of the present technology, in the interactive map section, each object of the object layer has at least one interactive element associated therewith.

In some implementations of the present technology, in the interactive map section, each object of the object layer has at least a first interactive element and a second interactive element associated therewith. For each object of the object layer: the first interactive element associated with the object is adapted to be activated as a result of a first user interaction, via the user interface, with the object; and the second interactive element associated with the object is adapted to be activated as a result of a second user interaction, via the user interface, with the object.

In some implementations of the present technology, a set of coordinates defining an interaction region on the interactive map for activating one of the at least one interactive element corresponds to a set of coordinates of a region of the map section covered by a corresponding object of the at least one object.

In some implementations of the present technology, the map section comprises at least one map tile.

In some implementations of the present technology, the object layer contains at least two objects associated with the requested information.

In some implementations of the present technology, the instructions for generating the object layer and the instructions for generating the logical layer are received as a combined set of instructions comprising the instructions for generating the object layer and the instructions for generating the logical layer.

In the context of the present specification, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the expression "interactive" is meant to indicate that something is responsive to a user's input or that at least portions thereof are responsive to a user's input.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
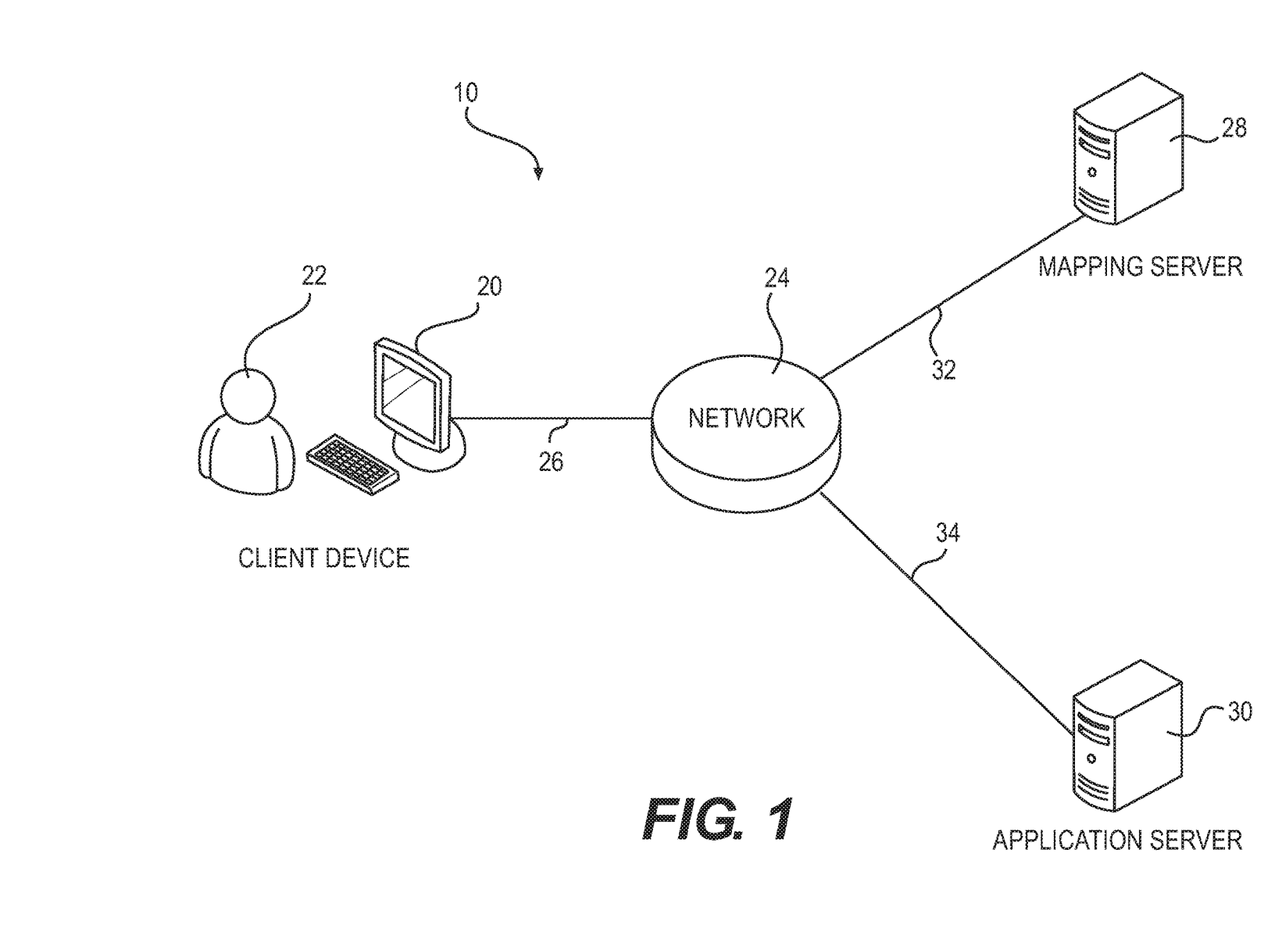
FIG. 1 is a schematic diagram of an exemplary system for providing an interactive map section on a user interface of a client device, the system being implemented in accordance with a non-limiting embodiment of the present technology.

Referring to FIG. 1, there is shown an exemplary schematic diagram of a system 10 being suitable for implementing non-limiting embodiments of the present technology. It is to be expressly understood that the system 10 is depicted as merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 10 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 10 may provide in certain instances simple implementations of the present technology, and that where such is the case they have been presented in this manner as an aid to understanding. As persons skilled in the art would understand, various implementations of the present technology may be of a greater complexity.

The system 10 comprises an electronic device 20. The electronic device 20 is typically associated with a user 22 and, as such, is being referred to herein as a client device 20. It should be noted that the fact that the client device 20 is associated with the user 22 does not need to suggest or imply any mode of operation, such as a need to log in, a need to be registered or the like.

The implementation of the client device 20 is not particularly limited, but as an example, the client device 20 may be implemented as a personal computer (desktop (as shown), laptop, netbook, etc.), and a wireless communication device (a cell phone, a smartphone, a tablet and the like). The client device 20 comprises hardware and software and/or firmware (or a combination thereof) for displaying a user interface, such as the user interface 200 (FIG. 7) and executing an associated program. The hardware of the client device 20 comprises a processor and a computer usable information storage medium communicating with the processor. Examples of the computer usable storage medium include, but are not limited to, one or more of RAM, ROM, disks (CD-ROMs, DVDs, floppy disks, hard drivers, etc.), USB keys, solid state-drives, tape drives.

The user interface is the user interface of an application that, as will be described in greater detail below, is programmed to display a map on the user interface. The application can be, but not limited to, a dedicated mapping application, such as the Yandex.Maps application for mobile devices, a web browser, or any other application providing including a map display portion. In a particular embodiment of the present technology, the user interface can be implemented on a web page that is not otherwise dedicated to maps (such as, for example, a web site of general interest, such as a bank web site, s restaurant web site and the like).

The user interface of the application is displayed on a display of the client device 20. The display of the client device 20 is typically a screen of the client device 20. It is contemplated that the client device 20 could be provided with a projector, in which case the display of the client device 20 is any surface onto which the projector projects the image of the user interface. It is also contemplated that the display of the client device 20 could be a screen of a secondary device such as a watch, a head mounted display, and a television, to name a few non-limiting example, communicating through a wired or wireless connection with the client device 20, in which case the secondary device is considered to form part of the client device 20 for purposes of the present application.

The user 22 interacts with the user interface of the client device 20 via any input device suitable for the type of client device. Examples of input devices include, but are not limited to, keyboards, mice, voice recognition devices, motion recognition devices, touchscreens, and brain-computer interfaces (BCI).

The client device 20 is coupled to a communications network 24 via a communication link 26. In some non-limiting embodiments of the present technology, the communications network 24 can be implemented as the internet. In other embodiments of the present technology, the communications network 24 can be implemented differently, such as any wide-area communications network, local-area communications network, a private communications network and the like.

How the communication link 26 is implemented is not particularly limited and will depend on how the client device 20 is implemented. Merely as an example and not as a limitation, in those embodiments of the present technology where the client device 20 is implemented as a wireless communication device (such as a smart-phone), the communication link 26 can be implemented as a wireless communication link (such as but not limited to, a 3G communications network link, a 4G communications network link, a Wireless Fidelity, or WiFi® for short, Bluetooth® and the like). In those examples, where the client device 20 is implemented as a notebook computer, the communication link can be either wireless (such as WiFi®, Bluetooth® or the like) or wired (such as an Ethernet based connection).

It should be expressly understood that implementations for the client device 20, the communication link 26 and the communications network 24 are provided for illustration purposes only. As such, those skilled in the art will easily appreciate other specific implementational details for the client device 102, the communication link 26 and the communications network 24. As such, by no means, examples provided herein above are meant to limit the scope of the present technology.

Also coupled to the communications network are a mapping server 28 and an application server 30. The servers 28, 30 can each be implemented as a conventional computer server. In an example of an embodiment of the present technology, each of the servers 28, 30 can be implemented as a Dell™ PowerEdge™ Server running the Microsoft™ Windows Server™ operating system. It is contemplated that the servers 28, 30 can be implemented in any other suitable hardware and/or software and/or firmware or a combination thereof. In the depicted non-limiting embodiment of present technology, each of the servers 28, 30 is a single server. In alternative non-limiting embodiments of the present technology, the functionality of each of the servers 28, 30 may be distributed and may be implemented via respective multiple servers. In alternative non-limiting embodiments of the present technology, the functionality of the servers 28, 30 may be combined in a single server. The mapping server 28 is coupled to the communications network 24 via a communication link 32. The application server 30 is coupled to the communications network 24 via a communication link 34. How the communication links 32, 34 are implemented is not particularly limited and will depend on how the servers 32, 34 are implemented. It is contemplated that the examples of implementations of the communication link 26 provided above could be applied to the communication links 32, 34.

As will be discussed below, the mapping server 28 is adapted to receive from the client device 20 a request for a map section, via the network 24 and links 26, 32, retrieve the requested map section from one or more map database (not shown) communicating with the mapping server 28, and send the requested map section back to the client device 20, via the network 24 and links 26, 32. As will also be discussed below, the application server 30 is adapted to receive from the client device 20 a request for information associated with the requested map section, via the network 24 and links 26, 34, retrieve the requested information from one or more information database (not shown) communicating with the application server 30, and send the requested information back to the client device 20, via the network 24 and links 26, 34. It is contemplated that the application server 30 can be a dedicated server associated with the application used on the client device 20. It is also contemplated that the application server 30 can be a server of a webmaster hosting a website accessed via a web browser application on the client device 20, the website being the one that the user is desirous of accessing on the client device 20 and viewing a map on. Other embodiments of application servers 30 are contemplated. It is contemplated that the mapping server 28 and the application server 30 could communicate with the client device 20 via distinct networks instead of the network 24.

Figure 2:
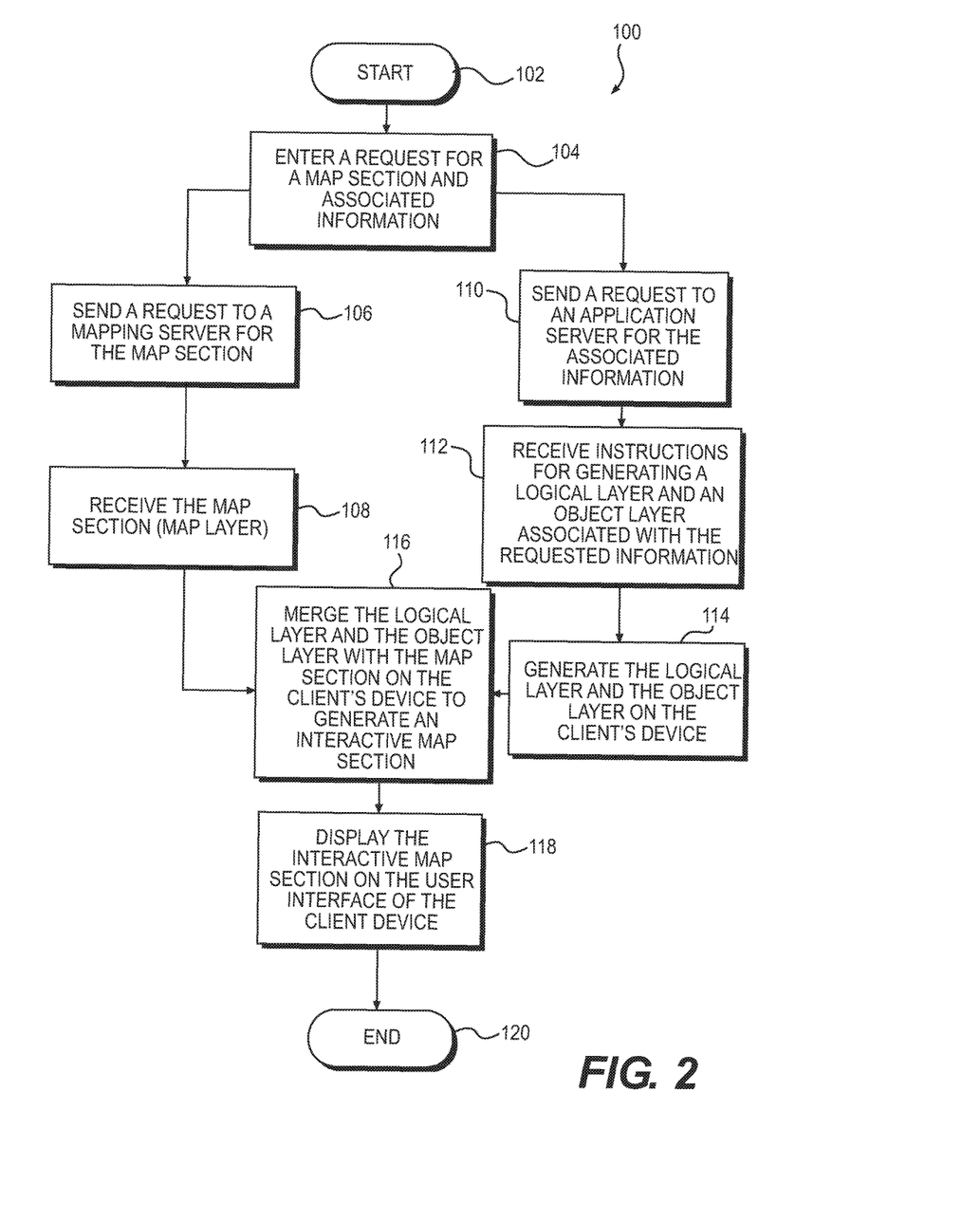
FIG. 2 is a flowchart of an exemplary implementation of a method for providing an interactive map section on a user interface of the client device of the system of FIG. 1.

Turning now to FIG. 2, a method 100 for providing an interactive map section on a user interface of the client device 20 using the system 10 will be described. Instructions causing the system 10 to perform the steps method 100 are stored on one or more computer usable storage mediums communicating with one or more processors of one or more components of the system 10. To facilitate understanding, the method 100 will be described in combination with a non-limiting example illustrated in FIGS. 3 to 7 for an application having the user interface 200. The exemplary user interface 200 corresponds to a user interface that could be found on a web browser for example.

The method 100 is initiated at step 102. At step 104, the user 22 enters a request in the user interface of the application running on the client device 20 for a map section and for information associated with this map section. In the user interface 200 illustrated in FIG. 7, the user 22 enters using an input device, such as a keyboard and a mouse for example, the desired map section and associated information in a search field 202. When the entry is completed, by pressing the "enter" key on the keyboard or clicking a "search" button, the request is sent at steps 106 and 110 described below. In the example illustrated in FIG. 7, the user 22 has entered "Restaurants in Westeros" in the search field 202 and a such wants the result of the search to display, on the user interface 200 of the client device 20, an interactive map section 204 showing the location of restaurants in Westeros. In this example, the requested map section is a map section 206 (FIG. 3) providing a map of "Westeros" and the associated information corresponds to the location of restaurants in Westeros and other information relating to these restaurants, such as, for example, address, telephone number, website, and reviews to name a few. It is contemplated that the associated information does not have to correspond to physical objects such as buildings, business, and other points of interest. For example, the associated information to be displayed on the map could be labels manually placed on a map by the user 22 during a previous use of the application, the location of friends (or more specifically of friends' client devices), the location of pictures taken or messages sent when such pictures and messages are associated with geographical coordinates and traffic or road conditions to name a few non-limiting examples.

It is contemplated that step 104 could require the user 22 to manually enter only one or none of the desired map section and information associated with this map section. For example, on a website of a bank, the user 22 could simply click on a "locate branch" link to generate a web page containing an interactive map section showing the location of branches of this particular bank. As the application relates to a particular type of object to be located on the map section (i.e. bank branches) the user 22 does not need to specify that this is the information to be requested. Similarly, the map section to be requested could be automatically selected based on an IP address or GPS coordinates associated with the client device 20, thereby providing a current location of the client device 20, or with a particular location previously stored in the application. In such an example, it is contemplated that the user 22 could specify a distance radius from the current or previously specified location to determine the map section to be presented. Alternatively, the user 22 could select a particular location, via a drop down menu or manual entry, for which the interactive map section is desired.

In another example, on an application programmed to provide the location of local points of interest on a mobile client device 20, the entry of the map section to be requested is generated based on the current location of the client device 20, using an IP address or GPS coordinates for example. The boundaries of the map section to be requested can be determined from a predetermined radius from the current location of the client device 20 or from such a radius selected by the user 22 of the client device 20. The user 22 then selects which type of points of interest, such as gas stations, restaurants, hotels, etc., are to be displayed on the map and a request for information associated with the selected points of interest associated with the predefined map section will be requested at step 110.

In another example, on an application programmed to provide an interactive map of the nearest locations of a particular chain of coffee shops for example, the user 22 only has to launch the application in order to send the request for the desired interactive map. The application uses the current location of the client device 20 to request the map section at step 106 and the associated information, requested at step 110, is known to be the location of the coffee shops and their associated information.

At step 106, the client device 20 sends, via the link 26, the network 24 and the link 32, the request for the map section entered at step 104 to the mapping server 28. As explained above, it is contemplated that at step 104 the desired map section can be manually entered by the user 22 via the user interface on the client device 20, or is entered automatically by the application providing the user interface based on predetermined criteria or a current location of the client device 20. Once the mapping server 28 receives the request for the map section, the mapping server 28 retrieves the map section from a map database.

In one exemplary embodiment, the map server contains map tiles each providing a map of a particular range of geographical coordinates. In one embodiment, each tile consists of a satellite picture, or an assembly of satellite pictures, of the area corresponding to its range of geographical coordinates. In another embodiment, each tile consists of an illustrated map corresponding to its range of geographical coordinates. In another embodiment, each tile is a combination of one or more satellite pictures and an illustrated map corresponding to its range of geographical coordinates. It is contemplated that the map database could contain two or more types of map tiles for each range of geographical coordinates and that the request for the map section could contain information regarding which type of map tiles is to be provided. Once the mapping server 28 receives the request for the map section, the mapping server determines the range of geographical coordinates spanned by the requested map section. The mapping server 28 then retrieves from the map database all of the map tiles necessary to generate the requested map section. It is contemplated that in some cases only a single map tile could be necessary to generate the requested map section.

Figure 3:
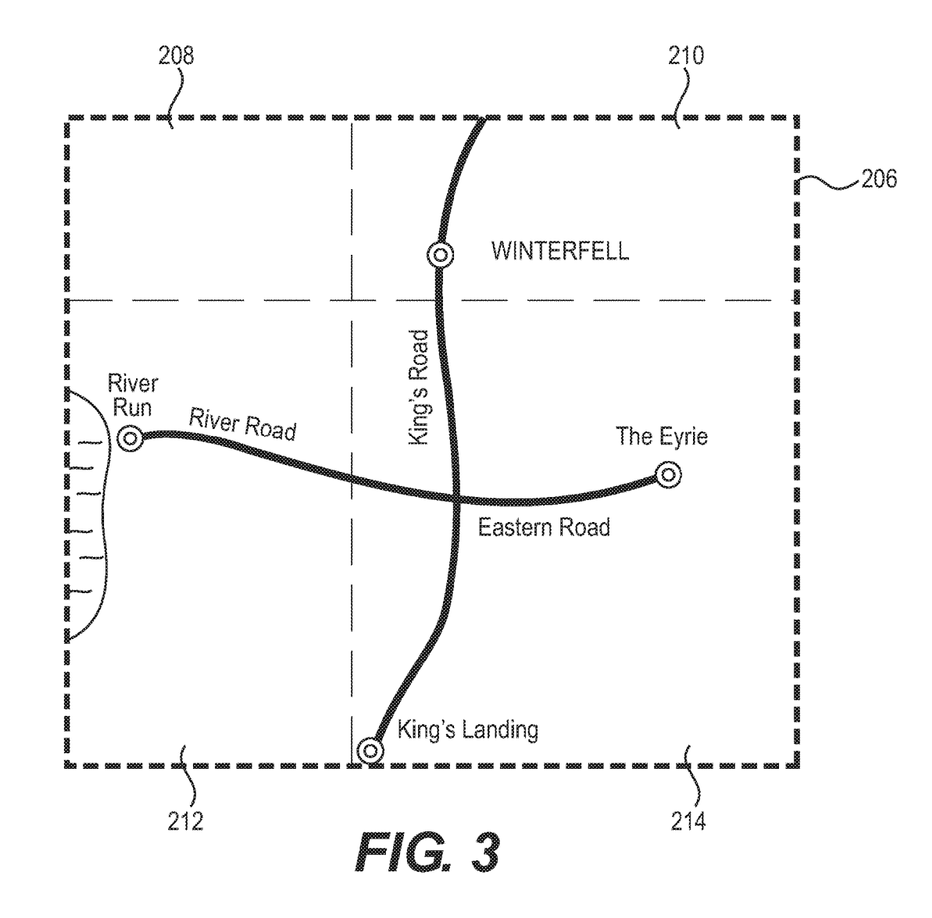
FIG. 3 illustrates an exemplary map layer generated by the method of FIG. 2.

As can be seen in FIG. 3, in order to generate the map section 206 corresponding to "Westeros", four map tiles 208, 210, 212 and 214 are necessary. The map section 206 is made of a lower right portion of the map tile 208, a lower portion of the map tile 210, a right portion of the map tile 212 and the entire map tile 214.

Once the mapping server 28 has retrieved the one or more elements necessary to create the requested map section from the map database, the mapping server 28 sends the map section to the client device 20 via the link 32, the network 24 and the link 26. It is contemplated sending the map section could consist in sending the required map tiles with instructions for an application programming interface (API) on the client device on how to arrange the map tiles with respect to each other and on which portions of the map tiles to display. Alternatively, it is contemplated that sending the map section could consist in assembling the map tiles on the mapping server 28 and sending the assembled map section to the client device 28. It is contemplated that the mapping server 28 could send a map section spanning a larger area than the requested map section such that should the user 22 interact with the interactive map resulting from the method 100 to pan or zoom the interactive map by a certain amount, the map sections adjacent the requested map section will already be available on the client device 20 and a new request to the mapping server 28 will not have to be made.

At step 108, the client device 20 receives the map section which forms a map layer. In an exemplary embodiment, an API on the client device 20 adjusts the map layer to fit in a space designed to display the map layer on the user interface of the client device 20. It is also contemplated that an API could convert geographical coordinates of the points of the map layer to pixel-based coordinates corresponding to their position on the user interface.

At step 110, the client device 20 sends, via the link 26, the network 24 and the link 34, the request for the information associated with the map section entered at step 104 to the application server 30. As explained above, it is contemplated that at step 104 the desired associated information can be manually entered by the user 22 via the user interface on the client device 20, or is entered automatically by the application providing the user interface based on predetermined criteria of the application. Once the application server 30 receives the request for the associated information, the application server 30 retrieves data regarding the associated information from an information database.

The data retrieved from the information database includes search results corresponding to the request entered at step 104. In one exemplary embodiment, the data in the information database is associated with map tiles, therefore by knowing which map tiles will form the map section, the application server 30 can retrieve the data associated with these map tiles. In the example illustrated in FIGS. 3 to 7, the search results provide a list of restaurants that are in Westeros. The data retrieved by the application server 30 from the information database also includes for each element of the search results a geographical location of the element in order to properly locate it on the map section as discussed below. The data retrieved by the application server 30 from the information database also includes additional information regarding each element of the search result, such as its name, its address, its telephone number, the URL for its website, and/or a link to another database where the additional information can be retrieved, such as a link to a client review website. As can be seen in FIG. 7 in the interactive map 204 displayed as a result of performing the present method 100 for "restaurants in Westeros", five restaurants (i.e. elements) were found, their coordinates used to locate them on the map layer and, although only shown for restaurant number 1 in the interactive map 204, the data retrieved for each restaurant also includes the name of the restaurant, the URL to the restaurant's website (the name of the restaurant being a hyperlink to the website, the restaurant's address, telephone number, and schedule, a link to a restaurant reservation website, a rating of the restaurant (one star in the case of restaurant 1), a thumbnail of a photo of the restaurant or its food and a link to more photos (the thumbnail being a hyperlink to these photos).

Using the information retrieved from the information database, the application server 30 then prepares instructions for generating an object layer and instructions for generating a logical layer. It is contemplated that these instructions could be combined as a set of instructions for generating both the object and logical layers. In an exemplary embodiment, the instructions are in the JavaScript Object Notation (JSON) format.

Figure 4:
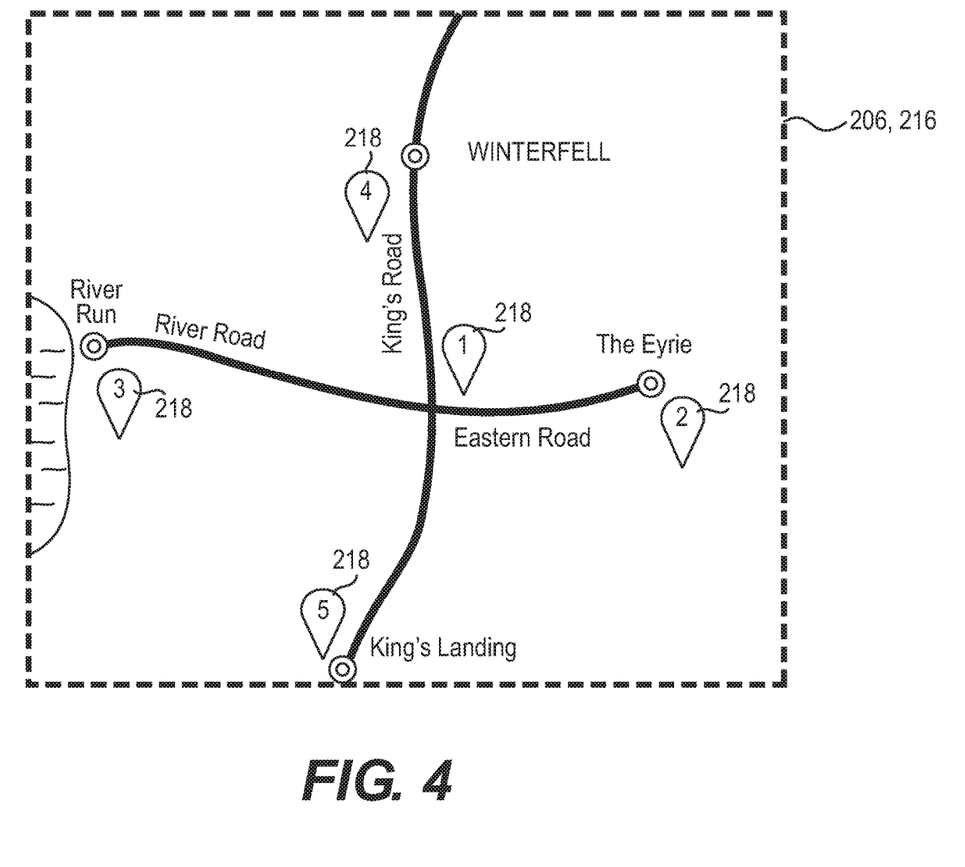
FIG. 4 illustrates the exemplary map layer of FIG. 2 overlaid with an exemplary object layer generated by the method of FIG. 2.

Each element of the search results corresponds to an object to be displayed in the object layer. In an exemplary embodiment, the instructions for generating the object layer contain an identifier for each object, its coordinates on the map section, instructions for generating the shape, color and size of the object to be displayed, and a label for each object. It is contemplated that the instructions for generating the map layer could contain more or less items than those listed and/or different items. FIG. 4 illustrates the map section 206 overlaid with an object layer 216 generated using the instructions prepared by the application server 30 for the request for "restaurants in Westeros". Five restaurants were found, as such, the object layer 216 contains five objects 218. The instructions for generating the object layer 216 in this example contain for each object 218 an object identifier (not shown), its location on the map section 206, instructions to generate a white teardrop shape to represent the object 218 and a label (1 to 5) to be applied on the shape. Hence, it can be said that within embodiments of the present technology, instructions for generating the object layer includes instructions for generating the object layer having at least two objects.

The logical layer includes instructions to enable interactive elements associated with the objects of the object layer which provide at least some of the information associated with the objects (name, address, etc.) when activated. It is contemplated that each object could have more than one interactive element associated therewith. The logical layer also defines for each object of the object layer an interaction region on the interactive map for activating the associated interactive element(s). Hence, the logical layer can be thought of as a mapping of (i) a user interaction with a particular object in the object layer and (ii) an action of or within an interactive element associated with the particular object within the object layer. In an embodiment, the coordinates, shape and size of an interaction region matches those of its associated object on the object layer. It is contemplated that the interaction region could be bigger or smaller than its associated object and could have a different shape than its associated object. In an exemplary embodiment, the instructions for generating the logical layer contain an identifier for each interactive element, coordinates on the map section of its interaction region, instructions for generating the shape, and size of its interaction region, instructions on the type of actions that activate the interactive element, instructions for generating the appearance of the interactive element (box, balloon, etc.), instructions for locating the interactive element with respect to its interaction region, and instructions regarding the content of the interactive element (i.e. the associated information retrieved). It is contemplated that the instructions for generating the logical layer could contain more or less items than those listed and/or different items.

Figure 5:
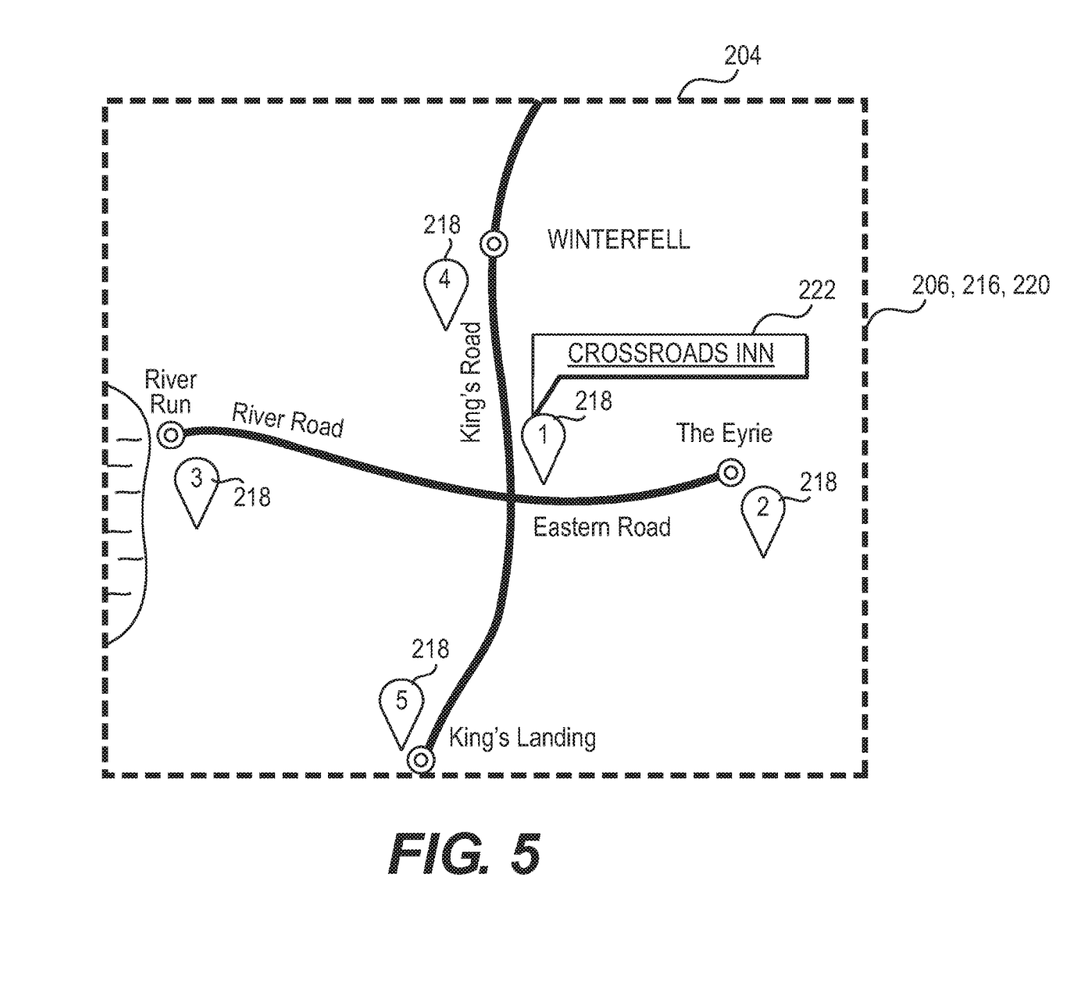
FIG. 5 illustrates an exemplary interactive map section generated by the method of FIG. 2 with an interactive element associated with an object of the object layer being activated.
Figure 6:
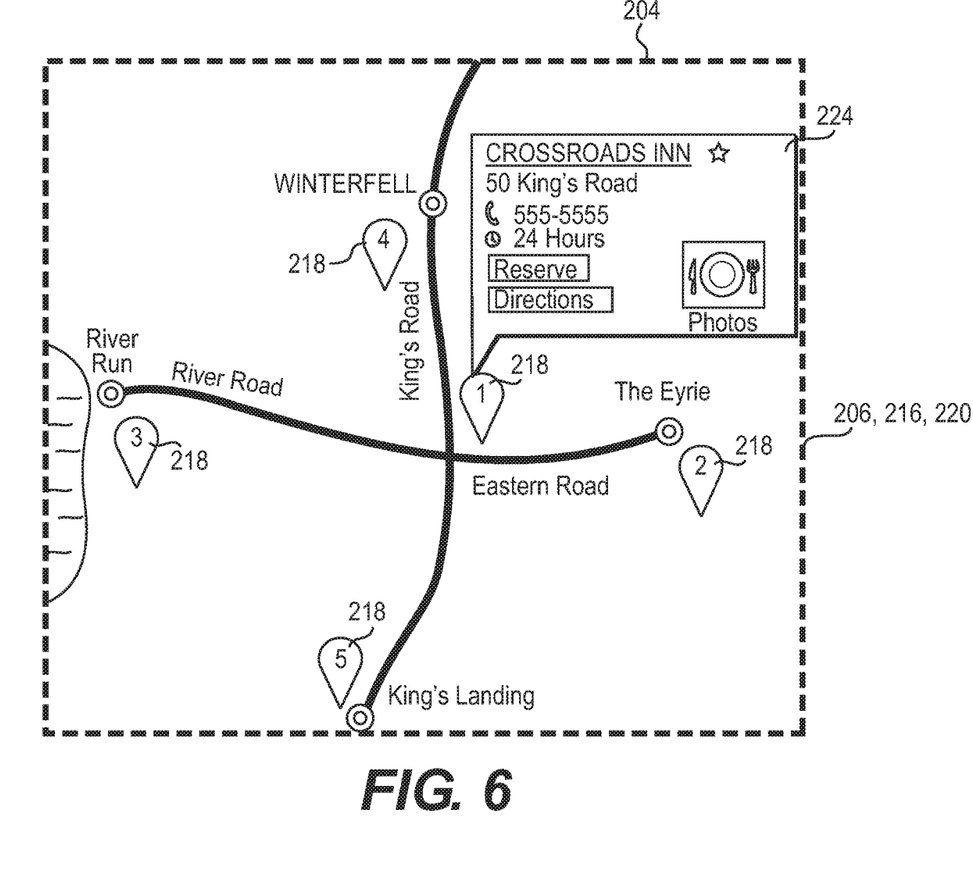
FIG. 6 illustrates the exemplary interactive map section of FIG. 5 with another interactive element associated with the same object of the object layer being activated.
Figure 7:
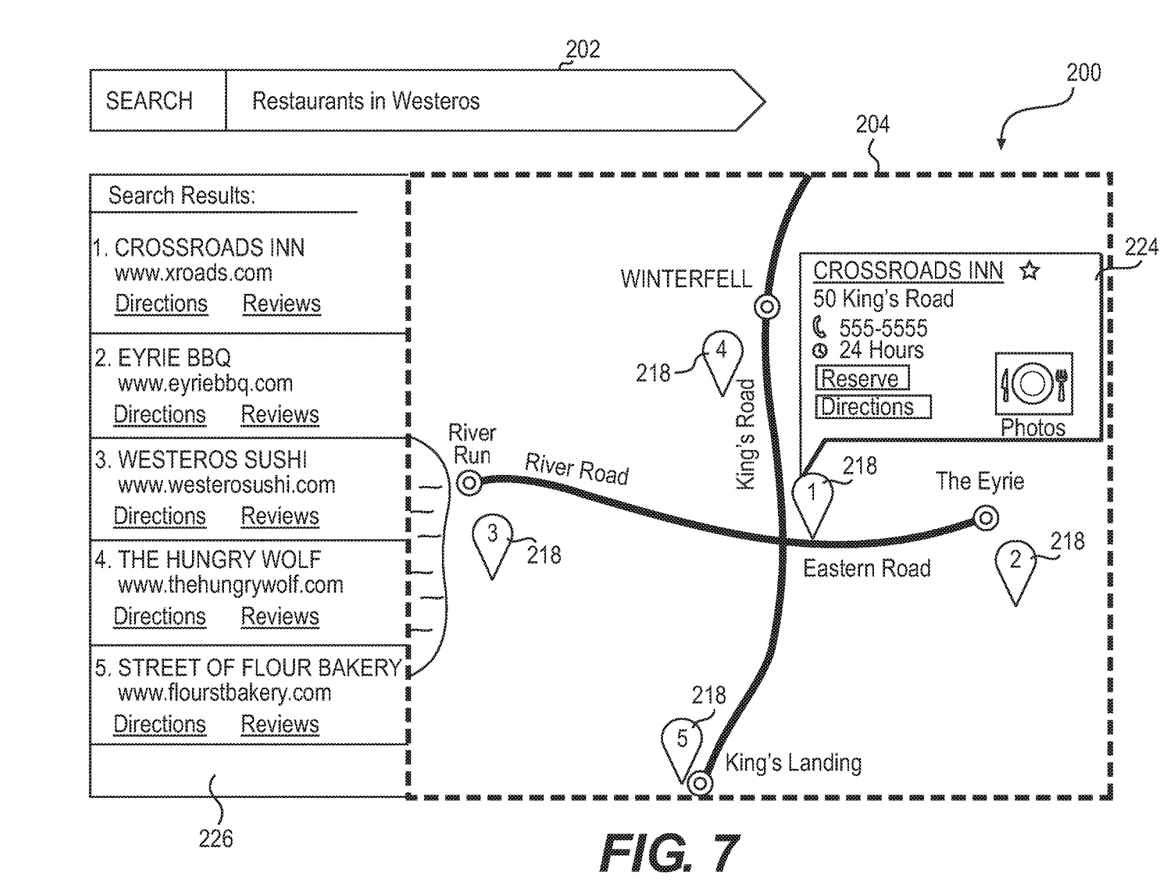
FIG. 7 illustrates a portion of an exemplary user interface of a client device displaying the interactive map section of FIG. 6.

FIGS. 5 and 6 illustrate the map section 206 overlaid with the object layer 216 and a logical layer 220 generated using the instructions prepared by the application server 30 for the request for "restaurants in Westeros". The instructions for generating the logical layer 220 in this example contain for each object 218 instructions for generating an interaction region matching the shape, size and location of the object 218, instructions to activate an interactive element 222 (FIG. 5) or an interactive element 224 (FIG. 6) depending on the type of interaction with the interaction region, instructions regarding the size, shape location and content of the elements 222, 224 and information regarding the content appearing in the elements 222, 224. It should be understood that since in the interactive map 204 resulting from the method 100 an object 218 and its corresponding interaction region match each other, and since the interaction region is not visible to the user 22, from the perspective of the user 22, the interaction occurs with the object 218. As such, it should be understood that in the present application, an interaction with an object corresponds to an interaction with its corresponding interaction region. In this example, when the user 22 "mouses over" an object 218 in the interactive map 204, the interactive element 222 is displayed as shown in FIG. 5. The interactive element 222 contains only the name of the corresponding restaurant. It is contemplated that the name of the restaurant could also be a hyperlink to a website of the restaurant. When the user 22 clicks an object 218 in the interactive map 204, the interactive element 224 is displayed as shown in FIG. 6. The interactive element 224 contains the name of the restaurant which acts as a hyperlink to its corresponding website, its address, telephone number, schedule, a link to make a reservation, a link to generate directions to the restaurant, the rating of the restaurant (one star in this case), and a thumbnail of a photo of the restaurant which acts as a hyperlink to more photos of the restaurant. The name (hyperlink), address, telephone number, and schedule are obtained directly from the information database by the application server 30. The instructions for generating the logical layer 220 provide instructions to be used by the API of the client device 20 on where to redirect the web browser to make a reservation or provide directions to the restaurant and instructions regarding where to retrieve the restaurant's rating and the thumbnail.

Returning to FIGS. 1 and 2, once the application server 30 has prepared the instructions for generating the object layer and the instructions for generating the logical layer, the application server 30 sends these instructions to the client device 20 via the link 34, the network 24 and the link 26. At step 112, the client device 20 receives the instructions.

At step 114, the API of the client device 20 uses the instructions to generate the object and logical layers. By generating these layers on the client device 20, and therefore by using the processing power of the client device 20, the amount of processing power needed on the application server 30 is reduced. It is contemplated that the object layer could be a bitmap (raster image) or a vector image. However, other formats for the object layer are contemplated.

As can be seen in FIG. 2, the steps 106, 108 associated with the mapping server 28 and the steps 110, 112, 114 associated with the application server 30 occur in parallel. However, it is contemplated that they could occur in series. It is also contemplated that steps 110, 112 and 114 could occur before steps 106 and 108. It is also contemplated that the order of the steps 106, 108, 110, 112, 114 could be any order in parallel or in series to the extent that step 108 occurs after step 106, step 112 occurs after step 110, and step 114 occurs after step 112. For example, the order of the steps, in series, could be 110, 106, 112, 108, 114.

At step 116, the API of the client device 20 takes the map layer, the object layer and the logical layer and merges them together such that the objects appear in the right location on the map section and the elements of the logical layer are properly located with respect to the objects. The merged layers form together an interactive map section providing the information entered at step 104 and with which the user 22 can interact via the user interface of the client device. By merging these layers on the client device 20, and therefore by using the processing power of the client device 20, the amount of processing power needed on the mapping and application servers 28, 30 is reduced.

At step 118, the client device 20 displays the interactive map section in the user interface. As can be seen in the exemplary user interface 200 shown in FIG. 7, in addition to displaying the search field 202 and the interactive map section 204, the user interface 200 also displays the search results matching the objects in the interactive map section 204 in a list 226 beside the interactive map section 204. The information used to generate the list 226 is obtained from the information retrieved by the application server 30 and used to generate the layers 216, 220. It is contemplated that the list 226 could be omitted and that the user interface 200 could have additional features such as a route planner link, zoom and pan tools, refine search options, map type selector (satellite, illustration, hybrid), and traffic display option to name a few.

In the example where a search is conducted for "restaurants in Westeros", the interactive map 204 would appear as the map section 206 and objects 218 shown in FIG. 4 should the user 22 not interact with any of the objects 218. Should the user 22 "mouse over" the object 218 corresponding to the "Crossroads Inn", the interactive element 222 is activated and the interactive map 204 appears as shown in FIG. 5. In this example, the user 22 can, if desired, click on the hyperlink to be redirected to the website of the Crossroads Inn restaurant. Should the user 22 click on the object 218 corresponding to the "Crossroads Inn", the interactive element 224 is activated and the interactive map 204 appears as shown in FIGS. 6 and 7. In this example, the user 22 can, in addition to viewing the information shown, if desired, click on the hyperlink to be redirected to the website of the Crossroads Inn restaurant, click on the "reserve" icon to make a reservation at the restaurant, click on the "direction" icon to generate an itinerary to the restaurant, click on the star rating to be redirected to a website providing client reviews and click on the thumbnail to be redirected to a website showing additional photos of the restaurant.

After step 118, should the user 22 zoom into the interactive map section, the client device 20 performs steps 114, 116 and 118 again for the zoomed in map section. After step 118, should the user 22 zoom out of or pan the interactive map section, the method is reinitiated at step 104 for the map section corresponding to the map section resulting from the zoom out or pan. It is contemplated that the map section received at step 108 could be bigger than the map section being displayed in the user interface. In such an embodiment, the associated information for the larger area would also be received at step 112. Since in this embodiment a certain amount of map section and associated information outside the displayed interactive map section resides on the client device 20, the client device 20 only needs to perform steps 114, 116 and 118 again should the user 22 zoom out or pan the interactive map within the larger map section obtained in this alternative step 108.

The method 100 ends at step 120 when the user 22 closes or reinitiates the application.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What claimed is:

1. A method for providing an interactive map section on a user interface of a client device comprising:
   sending, from the client device to at least one server via a communication network, a request for a map section;
   sending, from the client device to the at least one server via the communication network, a request for information associated with the map section;
   receiving, from the at least one server by the client device via the communication network, the map section, the map section forming a map layer;
   receiving, from the at least one server by the client device via the communication network, instructions for generating an object layer, the object layer containing at least one object associated with the requested information;
   generating the object layer on the client device using the instructions for generating the object layer;
   receiving, from the at least one server by the client device via the communication network, instructions for generating a logical layer, the logical layer containing at least one interactive element, the at least one interactive element being adapted to be activated as a result of a user interacting, via the user interface, with the at least one object of the object layer, the at least one interactive element for providing information associated with the at least one object;
   generating the logical layer on the client device using the instructions for generating the logical layer;
   merging the map layer, the object layer and the logical layer on the client device to generate the interactive map section; and
   displaying the interactive map section on the user interface of the client device;
   in response to receiving, via the user interface, a user interaction with the at least one object of the object layer, activating the at least one interactive element for displaying information associated with the at least one object on the user interface.

2. The method of claim 1, wherein:
   the at least one server includes a mapping server and an application server;
   sending, from the client device to the at least one server via the communication network, the request for the map section includes sending, from the client device to the mapping server via the communication network, the request for the map section;
   sending, from the client device to the at least one server via the communication network, the request for information associated with the map section includes sending, from the client device to the application server via the communication network, the request for information associated with the map section;
   receiving, from the at least one server by the client device via the communication network, the map section includes receiving, from the mapping server by the client device via the communication network, the map section;

receiving, from the at least one server by the client device via the communication network, instructions for generating the object layer includes receiving, from the application server by the client device via the communication network, instructions for generating the object layer; and receiving, from the at least one server by the client device via the communication network, instructions for generating the logical layer includes receiving, from the application server by the client device via the communication network, instructions for generating the logical layer.

3. The method of claim 1, wherein, in the interactive map section, each object of the object layer has at least one interactive element associated therewith.

4. The method of claim 3, wherein, in the interactive map section, each object of the object layer has at least a first interactive element and a second interactive element associated therewith;

wherein for each object of the object layer:
the first interactive element associated with the object is adapted to be activated as a result of a first user interaction, via the user interface, with the object; and
the second interactive element associated with the object is adapted to be activated as a result of a second user interaction, via the user interface, with the object.

5. The method of claim 1, wherein a set of coordinates defining an interaction region on the interactive map for activating one of the at least one interactive element corresponds to a set of coordinates of a region of the map section covered by a corresponding object of the at least one object.

6. The method of claim 1, wherein the object layer contains at least two objects associated with the requested information.

7. The method of claim 1, wherein the instructions for generating the object layer and the instructions for generating the logical layer are received as a combined set of instructions comprising the instructions for generating the object layer and the instructions for generating the logical layer.

8. A method for providing an interactive map section on a user interface of a client device comprising:
receiving, by at least one server from the client device via a communication network, a request for a map section;
receiving, by at least one server from the client device via a communication network, a request for information associated with the map section;
sending, by the at least one server to the client device via the communication network, the map section, the map section forming a map layer;
sending, by the at least one server to the client device via the communication network, instructions for generating an object layer on the client device, the object layer containing at least one object associated with the requested information; and
sending, by the at least one server to the client device via the communication network, instructions for generating a logical layer on the client device, the logical layer containing at least one interactive element adapted to be activated as a result of a user interacting, via the user interface, with the at least one object of the object layer, the at least one interactive element for providing information associated with the at least one object;
the client device being adapted for:
generating the object and logical layers,
merging the map layer, the object layer and the logical layer to generate the interactive map section, and
displaying the interactive map section on the user interface of the client device; and
in response to receiving, via the user interface, a user interaction with the at least one object of the object layer, activating the at least one interactive element for displaying information associated with the at least one object on the user interface.

9. The method of claim 8, wherein:
the at least one server includes a mapping server and an application server;
receiving, by the at least one server from the client device via the communication network, the request for the map section includes receiving, by the mapping server from the client device via the communication network, the request for the map section;
receiving, by the at least one server from the client device via the communication network, the request for information associated with the map section includes receiving, by the application server from the client device via the communication network, the request for information associated with the map section;
sending, by the at least one server to the client device via the communication network, the map section includes sending, by the mapping server to the client device via the communication network, the map section;
sending, by the at least one server to the client device via the communication network, instructions for generating the object layer includes sending, by the application server to the client device via the communication network, instructions for generating the object layer; and
sending, by the at least one server to the client device via the communication network, instructions for generating the logical layer includes sending, by the application server to the client device via the communication network, instructions for generating the logical layer.

10. The method of claim 8, wherein the instructions for generating the logical layer include instructions for generating the at least one interactive element, the at least one interactive element including at least one interactive element for each object of the object layer.

11. The method of claim 10, wherein the at least one interactive element for each object of the object layer has at least a first interactive element and a second interactive element;
wherein for each object of the object layer:
the first interactive element associated with the object is adapted to be activated as a result of a first user interaction, via the user interface, with the object; and
the second interactive element associated with the object is adapted to be activated as a result of a second user interaction, via the user interface, with the object.

12. The method of claim 8, wherein the object layer contains at least two objects associated with the requested information.

13. The method of claim 8, wherein the instructions for generating the object layer and the instructions for generating the logical layer are sent as a combined set of instructions comprising the instructions for generating the object layer and the instructions for generating the logical layer.

14. A system for providing an interactive map section on a user interface of a client device comprising:
a processor; and
a computer usable information storage medium communicating with the processor and storing instructions that cause the system to perform the steps of:
sending, from the client device to at least one server via a communication network, a request for a map section;
sending, from the client device to the at least one server via the communication network, a request for information associated with the map section;
receiving, from the at least one server by the client device via the communication network, the map section, the map section forming a map layer;
receiving, from the at least one server by the client device via the communication network, instructions for generating an object layer, the object layer containing at least one object associated with the requested information;
generating the object layer on the client device using the instructions for generating the object layer;
receiving, from the at least one server by the client device via the communication network, instructions for generating a logical layer, the logical layer containing at least one interactive element adapted to be activated as a result of a user interacting, via the user interface, with the at least one object of the object layer, the at least one interactive element for providing information associated with the at least one object;
generating the logical layer on the client device using the instructions for generating the logical layer;
merging the map layer, the object layer and the logical layer on the client device to generate the interactive map section;
displaying the interactive map section on the user interface of the client device; and
in response to receiving, via the user interface, a user interaction with the at least one object of the object layer, activating, by the client device, the at least one interactive element for displaying information associated with the at least one object on the user interface.

15. The system of claim 14, wherein:
the at least one server includes a mapping server and an application server;
sending, from the client device to the at least one server via the communication network, the request for the map section includes sending, from the client device to the mapping server via the communication network, the request for the map section;
sending, from the client device to the at least one server via the communication network, the request for information associated with the map section includes sending, from the client device to the application server via the communication network, the request for information associated with the map section;
receiving, from the at least one server by the client device via the communication network, the map section includes receiving, from the mapping server by the client device via the communication network, the map section;
receiving, from the at least one server by the client device via the communication network, instructions for generating the object layer includes receiving, from the application server by the client device via the communication network, instructions for generating the object layer; and
receiving, from the at least one server by the client device via the communication network, instructions for generating the logical layer includes receiving, from the application server by the client device via the communication network, instructions for generating the logical layer.

16. The system of claim 14, wherein, in the interactive map section, each object of the object layer has at least one interactive element associated therewith.

17. The system of claim 16, wherein, in the interactive map section, each object of the object layer has at least a first interactive element and a second interactive element associated therewith;
wherein for each object of the object layer:
the first interactive element associated with the object is adapted to be activated as a result of a first user interaction, via the user interface, with the object; and
the second interactive element associated with the object is adapted to be activated as a result of a second user interaction, via the user interface, with the object.

18. The system of claim 14, wherein a set of coordinates defining an interaction region on the interactive map for activating one of the at least one interactive element corresponds to a set of coordinates of a region of the map section covered by a corresponding object of the at least one object.

19. The system of claim 14, wherein the object layer contains at least two objects associated with the requested information.

20. The system of claim 14, wherein the instructions for generating the object layer and the instructions for generating the logical layer are received as a combined set of instructions comprising the instructions for generating the object layer and the instructions for generating the logical layer.

* * * * *